Figures 1, 2, 3:
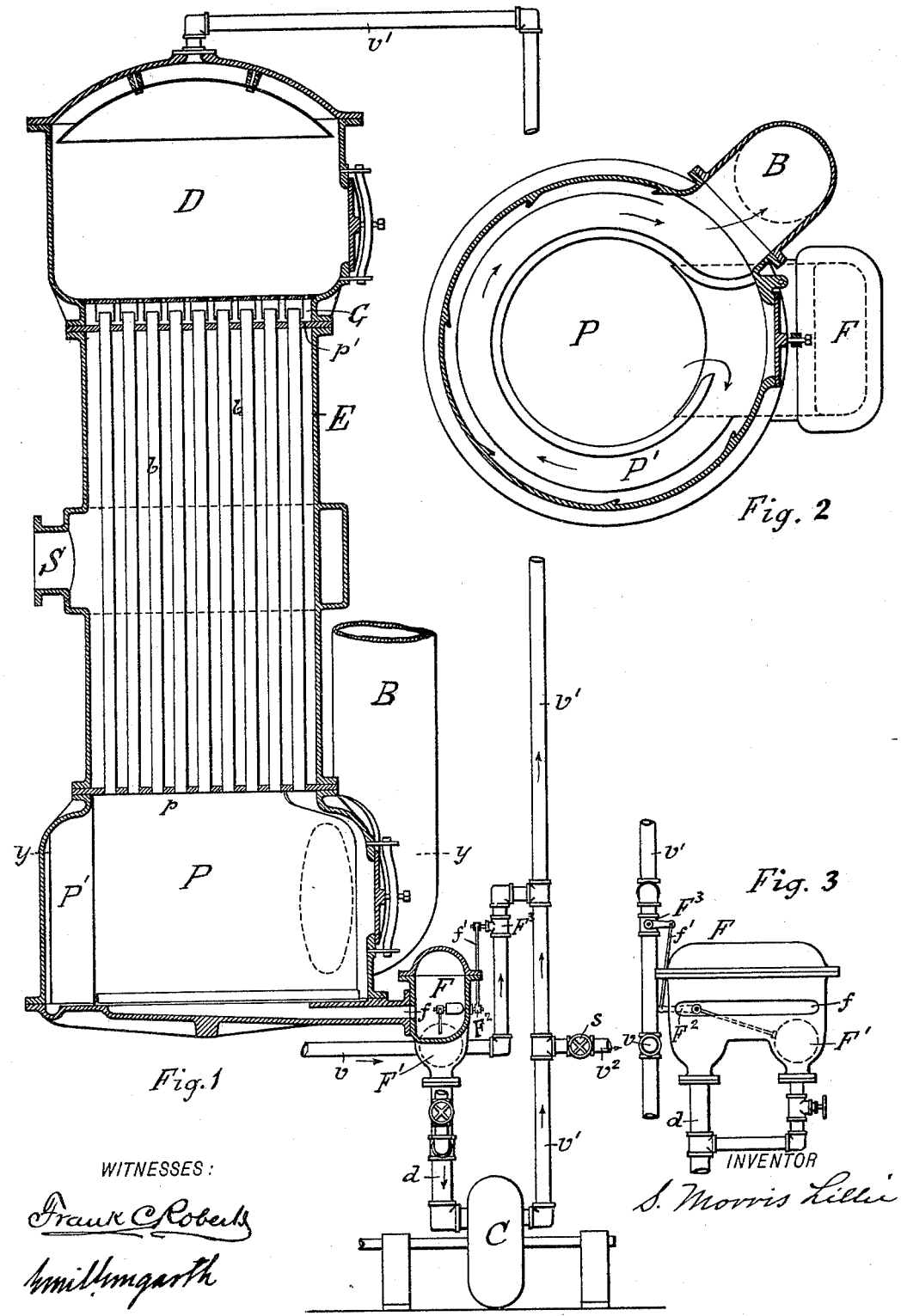

(No Model.)

S. M. LILLIE.
PROCESS OF EVAPORATING LIQUIDS.

No. 491,659. Patented Feb. 14, 1893.

WITNESSES:
Frank C. Roberts
[signature]

INVENTOR
S. Morris Lillie

UNITED STATES PATENT OFFICE.

SAMUEL MORRIS LILLIE, OF PHILADELPHIA, PENNSYLVANIA.

PROCESS OF EVAPORATING LIQUIDS.

SPECIFICATION forming part of Letters Patent No. 491,659, dated February 14, 1893.

Application filed January 7, 1890. Serial No. 336,203. (No specimens.)

*To all whom it may concern:*

Be it known that I, SAMUEL MORRIS LILLIE, of Philadelphia, State of Pennsylvania, have invented a new and useful Process of Concentrating Solutions by Evaporation, of which the following is a specification.

My invention relates to the evaporation of liquids in thin films, *i. e.*, to the evaporation of liquids by passing them in thin films over heated surfaces, and the object of my invention is to make the evaporation or concentration of the liquid a continuous process—that is, one in which the flow of the liquid into the apparatus and the flow of concentrated liquid from the apparatus are both continuous—and at the same time keep the heated evaporating surfaces thoroughly wetted with fluent liquid, even when, for any cause, the flow of thin liquid on to the surfaces is so slow as to be entirely inadequate to of itself keep the surfaces covered with films of liquid.

My invention consists in circulating and re-circulating over the heating surface in thin films some of the liquid being evaporated, and in continuously adding the thin liquid in regulated quantities to the circulating liquid and in drawing the concentrated liquid away continuously from the said circulating liquid.

The process may be practiced by means of a variety of apparatus, but for purposes of illustration I have taken a film evaporator of my own invention, the details of whose construction, and also its mode of operation as a film evaporator, are fully described and claimed by me in pending application Serial No. 305,984, and in United States Patent No. 466,862, dated January 12, 1892.

Other examples of film evaporators by which my process may be practiced may be found in Patents Nos. 344,586 and 422,235 issued to me respectively June 29, 1886, and February 25, 1890.

In the drawings Figure 1 is a sectional elevation of a single effect film evaporator adapted for practicing my process. Fig. 2 is a cross section of Fig. 1 on line *y y*. Fig. 3 is an elevation of the regulator for controlling the supply of thin liquor to the pan or effect.

Referring to the drawings, E is a heating or steam chamber containing a battery of vertical evaporating tubes *b*, which open below through the tube plate *p* into the collecting chamber P, and above through the tube plate *p'* into the feed chamber G, above which is a dome D into which a liquid conducting pipe *v'* delivers. Immediately above the tubes means, not needful to be described here, are provided by which any liquid delivered into the dome D by the pipe *v'* is evenly distributed among the tubes and over their interior surfaces so that it will run down the same in thin films until it reaches and falls into the collecting chamber P. The heat applied to the exteriors of the tubes, as by steam introduced into the chamber E, while liquid is thus flowing down the interior surfaces of the tubes, produces evaporation from the liquid, the resulting vapors from which pass from the lower ends of the tubes with the falling liquid into the chamber P.

The collecting chamber P is provided with an annular vapor passage P', communicating at one end with the chamber P, and at the other end with the vapor escape main B, through which the vapors of evaporation escape from the pan. The collecting chamber P has also a liquid escape passage *f* which leads into the float chamber F. A pipe *d* leads from the float chamber F to the circulating pump C, which latter delivers through the return pipe *v'* back into the dome D of the pan, and through the discharge branch *v²* away from the pan, the discharge branch *v²* being in the case of a multiple effect the liquid supply of the next pan of the series: such a multiple effect is shown and described in my patent No. 466,862, dated January 12, 1892. The supply pipe *v* of the pan delivers the thin liquid to be concentrated into the return pipe *v'* of the same in which it becomes thoroughly mixed with the thicker return liquid before entering the dome D and the evaporating tubes. The discharge pipe *v²* branches from the return pipe *v'* preferably at a point between the pump C and the supply pipe *v*, in order that the thickened liquid leaving the pan by it may not be diluted by the thin liquid entering from the supply pipe. A float F' in the float chamber F rises and falls with the level of the liquid in the chamber, and through the lever F² and connecting mechanism *f'* a butterfly valve F³ in the pipe *v* which brings the liquid to be evaporated to the pan, is operated in such manner that as the float rises the valve closes, and as it falls the valve opens in proportion.

During the practicing of the process the circulating pump C is continually running, and is consequently continually circulating liquid from the chamber P into the dome D and down over the surfaces of the tubes into the chamber P again, the rapidity of the circulation being preferably sufficiently rapid to keep the surfaces thoroughly wetted independently of the quantity of liquid entering the apparatus, so that even were the latter restricted to a very slight flow the heating surfaces would be properly covered with films of fluent liquid.

The operation of the apparatus shown in the drawings in concentrating a liquid by evaporation in accordance with my process is as follows: The liquid to be concentrated flows continuously by the supply pipe $v$ and the pipe $v'$, mixed with the circulating liquid through the cap of the dome D, and by the distributing devices is distributed among the tubes $b$, and over their interior surfaces down which it flows in thin films suffering evaporation in its course due to a heating agent, as steam, supplied to the heating chamber E by the main S. The unevaporated liquid falls from the bottom of the tubes, together with vapor formed by the evaporation, into the collecting chamber P, and flows by the passage $f$ into the float chamber whence it is drawn by the pump C and is delivered in part away from the pan continuously (see arrows Fig. 1) by the discharge pipe $v^2$, which is the supply pipe of the next pan in the case of a multiple effect, and in part is returned by the pipe $v'$ to the heating surfaces again. The rate of feed of the thin liquid from the supply pipe $v$ to the pan, is governed by the flow of concentrated liquid away from the pan through the discharge pipe, and by the automatic action of the float. If the discharge is increased by opening wider the valve $s$, the level of the liquid in the float chamber and consequently the float itself will fall until the butterfly valve in the supply pipe $v$ is opened sufficiently to correspondingly increase the feed of the thin liquid into the pan: If the flow from the discharge pipe is diminished by partially closing its valve $s$, the level of the liquid in the float chamber and also the float rises, and the feed from the supply pipe is correspondingly diminished. Other things remaining equal, the density of the finished product is diminished in proportion as the valve $s$ in the discharge pipe $v^2$ is opened, and is increased in proportion as the valve is closed; to regulate its density it is only necessary to open or close the valve, as the case may be, until the thickened material leaves the discharge pipe at the desired density. The function of the pump C, in addition to that of discharging liquid from the pan—to the next evaporating pan in the case of a multiple effect—is to maintain a constant circulation of liquid in the pan to assist the fresh liquid in keeping the heating surfaces well covered. The vapors resulting from the evaporation pass from the tubes into the collecting chamber P, and thence through the annular passage P' and away from the pan by the vapor main B.

In my patent No. 466,862 issued January 12, 1892, the process is illustrated in connection with a multiple effect in which there is an independent circulation of liquid in each effect, i. e., the process is completely practiced in each individual effect of the multiple effect. In Patent No. 422,235 issued to me February 25, 1890, the process is illustrated as practiced with a multiple effect as an entirety, i. e., instead of an independent circulation in each pan, the circulation of liquid is from the last pan of the multiple effect back into the first pan of the same.

From the preceding it is seen that my process of concentrating liquids by film evaporation consists in the continuous circulation of a portion of the liquid being concentrated over the heating surfaces in films, from the discharge end of the same to and over the surfaces to the discharge end of the same, and in adding continuously the thin liquid to the circulating liquid at one point, and as continuously drawing the concentrated liquid from the circulating liquid at another point in its course. The liquid which is returned from the heating surface back onto the heating surface has a degree of concentration either the same as, or somewhat greater than, the concentrated liquid which is constantly flowing from the pan, depending upon where the thin liquid is added to the circulating liquid with respect to the point at which the concentrated liquid is drawn away from the circulating liquid. If the thin liquid be added to the circulating liquid at a point between the receiving ends of the heating surfaces— the upper ends of the tubes in the apparatus of the drawings—and the point of drawing away the concentrated liquid, the said liquid returned will be of the same density as the concentrated liquid drawn away from the pan; this would be the case if the thin liquid were added through the pipe $v$, and the concentrated liquid taken away through the pipe $v^2$. in the apparatus of the drawings. If however the thin liquid be added to the circulating liquid at a point between the discharge ends of the heating surfaces and the point of discharge of the concentrated liquid, then the said liquid returned must be sufficiently concentrated so that when thinned by the inflowing thin liquid it will have the density desired for the concentrated liquid flowing away from the pan. In the case of the apparatus of the drawings this second method of working would be followed if the thin liquid were added through the pipe $v^2$ and the concentrated liquid taken away by the pipe $v$. My process is not limited to adding the thin liquid to, or taking the concentrated liquid from the circulating liquid at any particular points.

I claim as of my invention,

The process of concentrating a liquid by evaporation, consisting in circulating and recirculating a portion of the liquid to be concentrated continuously in thin films over a heated evaporating surface, and in continuously adding thin liquid to be concentrated in regulated quantities to the said circulating liquid, and simultaneously drawing away concentrated liquid from the circulating liquid substantially as described.

S. MORRIS LILLIE.

Witnesses:
 WM. A. CASSEDAY,
 EMIL EMGARTH.